United States Patent [19]

Aono et al.

[11] Patent Number: 4,634,237

[45] Date of Patent: Jan. 6, 1987

[54] ZOOM LENS

[75] Inventors: Yasuhiro Aono; Yasuo Yonezawa, both of Kawasaki, Japan

[73] Assignee: Nippon Kogaku K. K., Tokyo, Japan

[21] Appl. No.: 624,694

[22] Filed: Jun. 26, 1984

[30] Foreign Application Priority Data

Jun. 30, 1983 [JP] Japan ................. 58-119419

[51] Int. Cl.$^4$ ............................. G02B 15/14
[52] U.S. Cl. ..................................... 350/427
[58] Field of Search .................. 350/423–427

[56] References Cited

U.S. PATENT DOCUMENTS 4,281,906 8/1981 Tanaka ................. 350/427
4,518,228 5/1985 Sugiura ................ 350/427
4,572,620 2/1986 Kikuchi ................ 350/427

Primary Examiner—John K. Corbin
Assistant Examiner—Scott J. Sugarman
Attorney, Agent, or Firm—Shapiro and Shapiro

[57] ABSTRACT

A zoom lens comprises, in the order from the object side, a first lens group which has a positive power and is fixed in position during zooming, second and third lens groups which have negative powers and movable during zooming, and a fourth lens group which is fixed in position during zooming.

When the zoom lens is zoomed from a side angle end to a telephoto end, the second lens group is monotonously moved along an optical axis from the object side to the image side, and the third lens group reciprocates along the optical axis. The zoom lens satisfies the certain conditions.

8 Claims, 13 Drawing Figures

ZOOM LENS

BACKGROUND OF THE INVENTION

1. Field of the Invention

The present invention relates to a compact zoom lens which has a high aperture ratio and a high zooming ratio.

2. Description of the Prior Art

Demands have recently arisen for a compact and lightweight zoom lens which has a high aperture ratio, a wide angle of view, and a high zooming ratio. In order to provide a compact zoom lens, the power of each lens group is increased conventionally. However, with this method, various aberrations, especially the Petzval's sum, becomes too great negative values, so that the image plane becomes non-flat. However, if the zooming ratio is increased and the angle of view at a wide angle end is increased, correction of a large barrel-shape distortion generated at the wide angle end becomes difficult.

SUMMARY OF THE INVENTION

It is an object of the present invention to provide a high-performance zoom lens which has a high zooming ratio, a high aperture ratio and a wide angle of view, which is yet compact in size, and in which various aberrations, especially the Petzval's sum, and distortion are satisfactorily corrected.

DETAILED DESCRIPTION OF THE PREFERRED EMBODIMENTS

Figure 1:
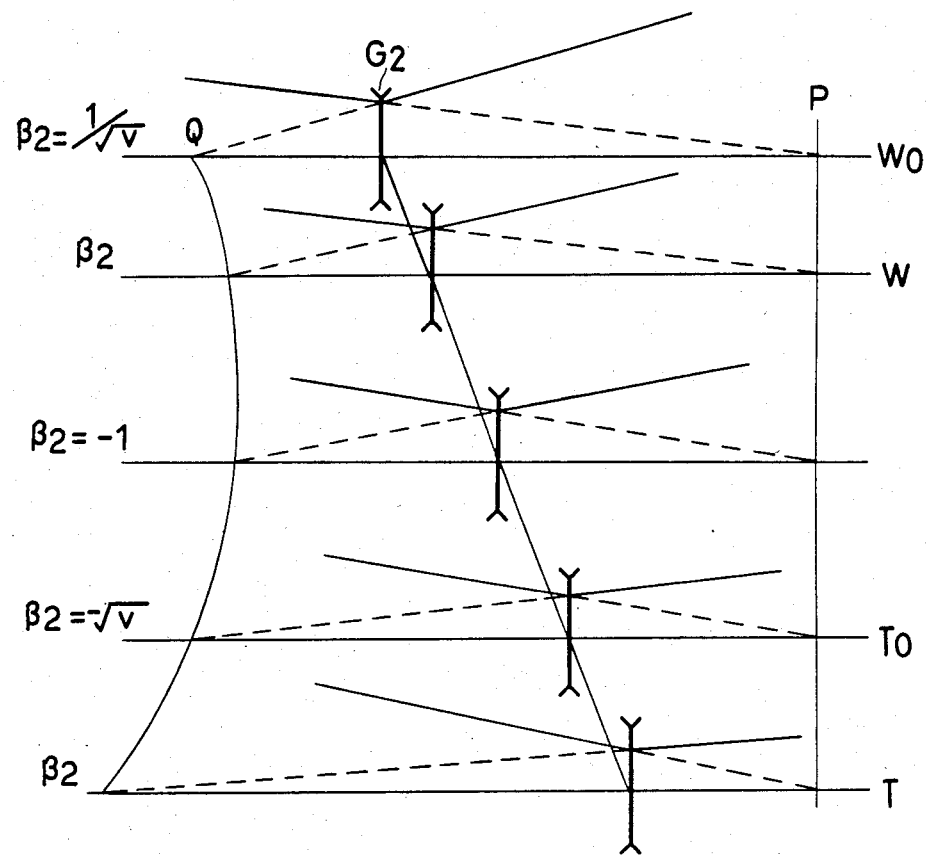
FIG. 1 is a representation showing the function of a second lens group according to the present invention.

A zoom lens according to the present invention consists of a first lens group which has a positive power and is fixed in position during zooming, a second lens group which has a negative power and which is moved from an object side to an image side along the optical axis when the zoom lens is zoomed from a wide angle end to a telephoto end, a third lens group which has a negative power and reciprocates along the optical axis during zooming, and a fourth lens group which has a positive power and is fixed in position during zooming. When the focal length at the telephoto end is represented by fT, the minimum F number at the telephoto end is represented by FT, the focal length of the first lens group is represented by f1, the magnification factor of the second lens group at the wide angle end is represented by $\beta 2w$, and the zooming ratio is represented by V, the following relations are established:

$$0.68 < \sqrt{FT} \cdot f1/fT < 0.74 \tag{1}$$

$$1.1 < |\beta 2w \cdot \sqrt{V}| < 1.3 \tag{2}$$

The preferred embodiments of the present invention will now be described. In general, in order to render compact the variable power section of the zoom lens, the power of each lens group of the variable power section can be increased. However, if the zooming ratio or the maximum aperture ratio changes, a maximum power of the variable power section also changes. For this reason, even if the powers of the respective lens groups of the variable power section are simply compared with each other, the degree of compactness of the variable power section is not easy to estimate. However, the quantity $\sqrt{FT} \cdot f1/fT$ is known to be an index representing the degree of compactness of the variable power section.

According to the present invention, the variable power section is rendered compact in size since the quantity $\sqrt{FT} \cdot f1/fT$ satisfies relation (1) above. When this quantity exceeds the upper limit given by relation (1), the variable power section cannot be rendered compact in size. However, if this quantity is below the lower limit given by relation (1), although a satisfactory compact size can be realized, various aberrations become notable. Especially since the powers of the second and third lens groups are increased, the Petzval's sum is degraded and the apparent F number of the first lens group at the telephoto end becomes too small. Therefore, correction of the distortion at the telephoto end becomes difficult. Furthermore, the tolerance requirements during the manufacture of lenses become strict, and image degradation due to eccentricity of the lenses becomes notable.

According to the present invention, the zooming ratio V and the magnification factor $\beta 2w$ of the second lens group at the wide angle end satisfy relation (2) above. Then, even if the variable power section is rendered compact in size by satisfying relation (1), the power of the second lens group can be decreased, and the Petzval's sum is not degraded. In a zoom lens of the type according to the present invention, the power of the second lens group is highest among all the lens groups. Thus, if the negative power of the second lens group is minimized, the Petzval's sum can be rendered optimal.

FIG. 1 shows zooming with a second lens group G2. Referring to FIG. 1, corresponds to the image point of by the first lens group, i.e., the object point for the second lens group. Q corresponds to the locus of the image point formed by the second lens group G2, i.e., the locus of the object point for the third lens group.

When the magnification factor of the second lens group is represented by $v$ and when a range Wo–To in which the magnification factors of the second lens group at the wide angle and telephoto ends are respectively set to be $-(1/\sqrt{v})$ and $-\sqrt{v}$ is selected as a standard variable power region, the position of the image point Q is the same at both the wide angle and telephoto ends and an image point of the third lens group is also the same at both the wide angle and telephoto ends. The value of $v$ is also the zooming ratio of the overall lens system. If a space is represented by $\Delta$ which is required to prevent mechanical interference among the respective lens groups at the wide angle end at which the first and second lens groups are nearest to each other, the magnification factor $\beta 2w$ and a focal length f2 of the second lens group, respectively, at the wide angle end hold the following relation:

$$f2 = (f1 - \Delta) \cdot \beta 2w/(1 - \beta 2w) \qquad (3)$$

As can be seen from equation (3) above, if the value of $\beta 2w$ is greater than $-1/\sqrt{v}$, the value of $|f2|$ is increased and the power of the second lens group is decreased. This means that, in FIG. 1, the variable power region of the second lens group is selected to be a region W–T lower than the standard variable power region Wo–To. According to the present invention, the variable power region of the second lens group is limited to be a region defined by the relation (2) above. When the value of a quantity $|\beta 2w \cdot \sqrt{v}|$ is less than the lower limit defined by relation (2), the power of the second lens group is increased and the Petzval's sum is degraded. However, when the value of the quantity $|\beta 2w \cdot \sqrt{v}|$ exceeds the upper limit defined by relation (2), a space to allow the second lens group to zoom becomes enlarged, and the overall length of the lens system and the front lens diameter are increased. In addition, the ratio of the displacement amount of the third lens group to that of the second lens group in the vicinity of the telephoto end during zooming becomes extremely great, so that the mechanism of a lens barrel for zooming the second and third lens groups becomes is not well operated.

According to the present invention, the distance $\Delta$ between the principal points of the first and second lens groups at the wide angle end is kept at a minimum value so as to widen the movable space of the second lens group and to decrease the lens power. For this purpose, a first lens group G1 has an arrangement wherein a negative lens L11 is arranged at the side of an object, and at least three positive lenses L12 to L14 are arranged at the side of an image, so that the principal point of the first lens group is close to the image, as in an embodiment shown in FIG. 2 or 4. In this case, when the focal lens of the negative lens L11 of the first lens group is represented by F1N and the distance between the image side principal point of the negative lens L11 and the object side compound principal point of the next positive lens is represented by D1, the following conditions must be satisfied:

$$1.5 < |f1N/f1| < 1.85 \qquad (4)$$

$$0.19 < D1/f1 < 0.22 \qquad (5)$$

When the quantity $|f1N/f1|$ exceeds the upper limit given by the relation (4) above, the power of the negative lens is too weak and the principal point of the first lens group cannot be located near the image and the chromatic aberration cannot be sufficiently corrected. However, when the quantity $|f1N/f1|$ becomes below the lower limit, the power of the negative lens becomes too strong. Then, the negative distortion occurring at the wide angle end cannot be corrected by the second lens group and other subsequent groups. When the quantity D1/f1 is below the lower limit given by the relation (5), the principal point of the first lens group cannot be located near the image. However, when the quantity D1/f1 exceeds the upper limit given by the relation (5), the light rays propagating along the optical axis from the negative lens at the telephoto end are diverged significantly when they become incident on the positive lens group. Then, the lens diameter of the positive lens group is enlarged. In this case, the spherical and chromatic aberrations cannot be sufficiently corrected.

The second lens group G2 consists of a negative meniscus lens L21 having a convex side facing the object, and two composite lenses L22 and L23 respectively comprising a convex lens and a concave lens which are cemented together. The lens L22 at the side of the object has a surface of a greater radius of curvature at the side facing the image. The lens L23 has a convex, meniscus shape at the side of the image. When the radius of curvature of the negative lens L21 at the side of the object is represented by R21, the following relation is preferably satisfied:

$$2.4 < |R21/f2| < 3.7 \qquad (6)$$

When this condition is satisfied, even if the zoom ratio is great, the fluctuation in the chromatic aberration during zooming can be reduced to the minimum. When the quantity $|R21/f2|$ exceeds the upper limit given by the relation (6), the negative distortion occurring in the first lens group at the wide angle end cannot be sufficiently corrected. However, when the quantity $|R21/f2|$ is below the lower limit given by the relation (6), the variations in various aberrations upon zooming, especially the variation in the curvature of field, cannot be sufficiently corrected.

A third lens group G3 preferably comprises a negative lens L3 which is a doublet lens of a biconcave lens and a positive lens cemented together. A fourth lens group G4 comprises, in the order from the side of the object, a front group consisting of a positive meniscus lens L41 having the convex surface facing the image side, a biconvex positive lens L42, a biconvex positive lens L43, and a negative lens L44 having a surface of a greater curvature facing the object side; and a rear group consisting of a doublet positive lense of a lens L45 and a lens L46 cemented together and a positive meniscus lens L47 having the convex surface facing the object side.

The embodiment of the present invention will now be described.

In each of the first, second and third embodiments of the present invention, the zoom lens is compact in size, has a wide variable power region corresponding to a zoom ratio of about 15, and a maximum angle of view of 69° at a maximum aperture ratio of 1:1.6.

Figure 2:
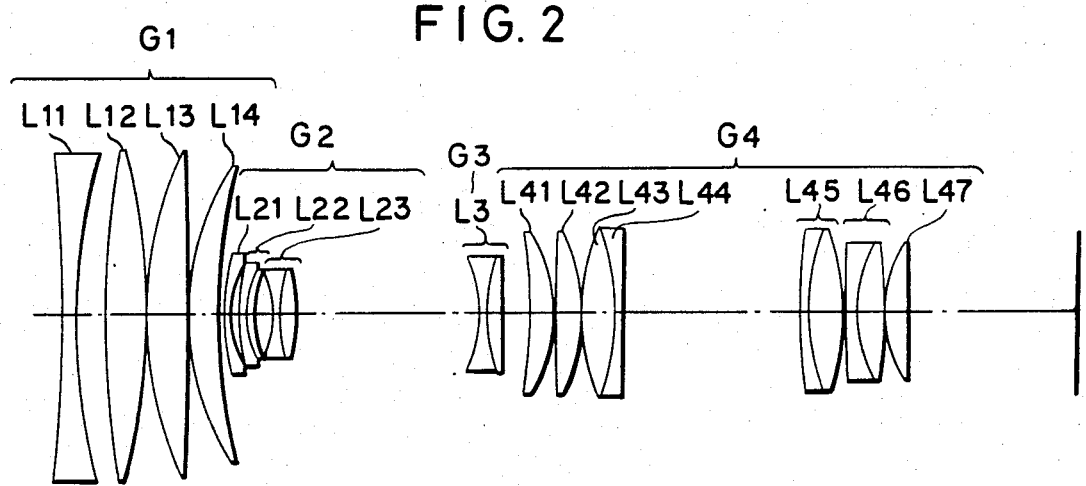
FIG. 2 is a diagram showing the lens construction according to a first embodiment of the present invention.
Figure 3A:
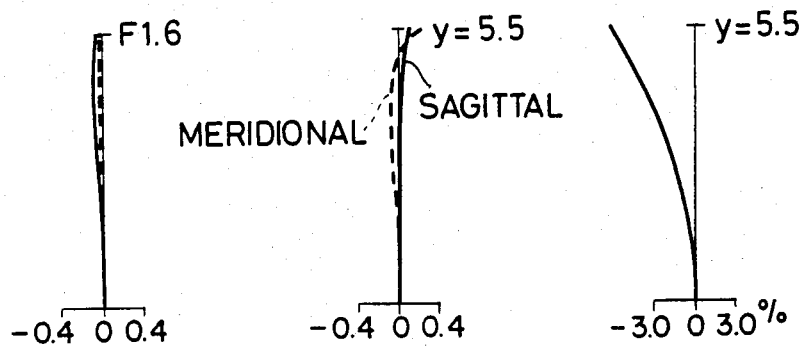
FIGS. 3(A) to 3(C) respectively show a spherical aberration, an astigmatism and a distortion in the minimum, intermediate and maximum focal length states, respectively, according to the first embodiment of the present invention (with the sine condition error amount being represented by dotted curves)
Figure 3B:
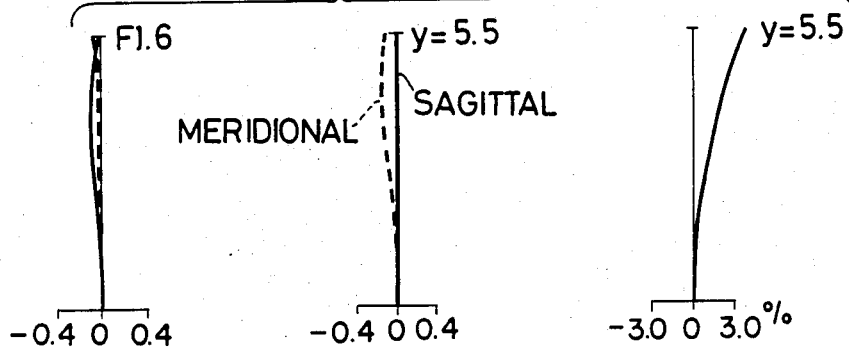
Figure 3C:
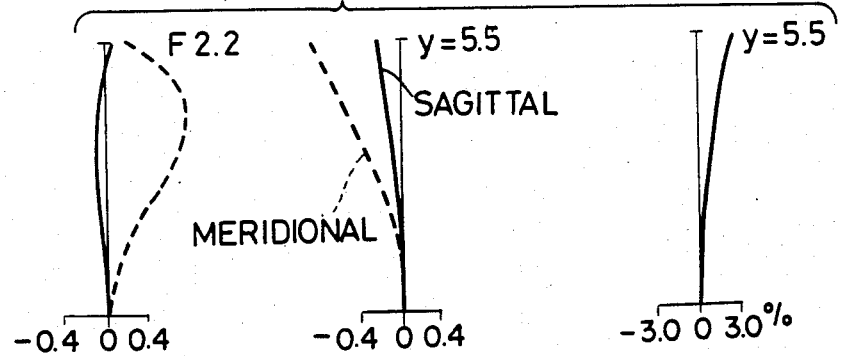
Figure 4:
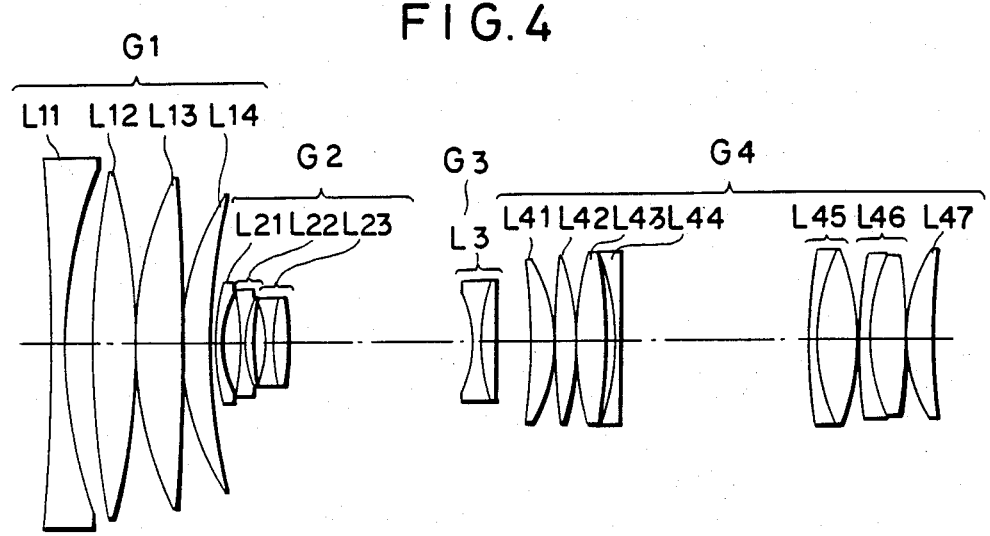
FIG. 4 is a diagram showing the lens construction according to a second embodiment of the present invention.
Figure 6:
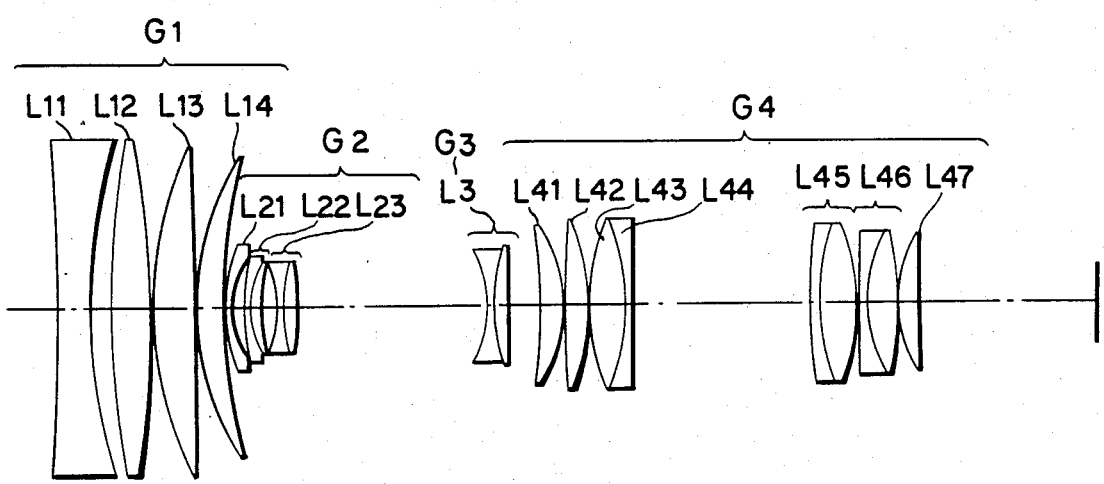
FIG. 6 is a diagram showing the lens construction according to a third embodiment of the present invention.
Figure 5A:
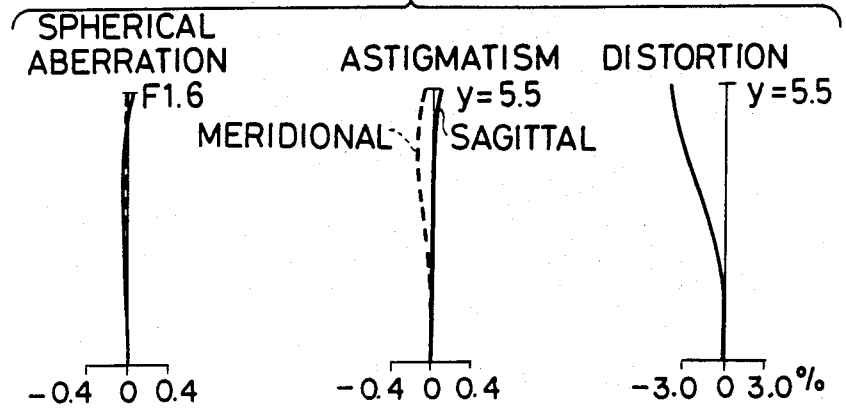
FIGS. 5(A) to 5(C) respectively show a spherical aberration, an astigmatism and a distortion in the minimum, intermediate and maximum focal length states, respectively, according to the second embodiment of the present invention (with the sine condition error amount being represented by dotted curves)
Figure 5B:
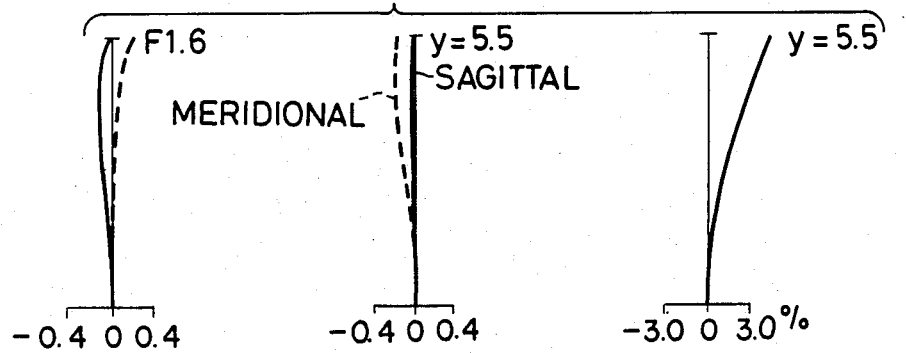
Figure 5C:
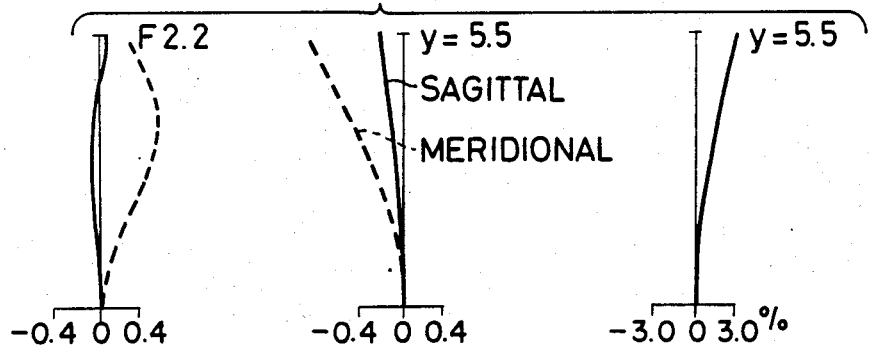
Figure 7A:
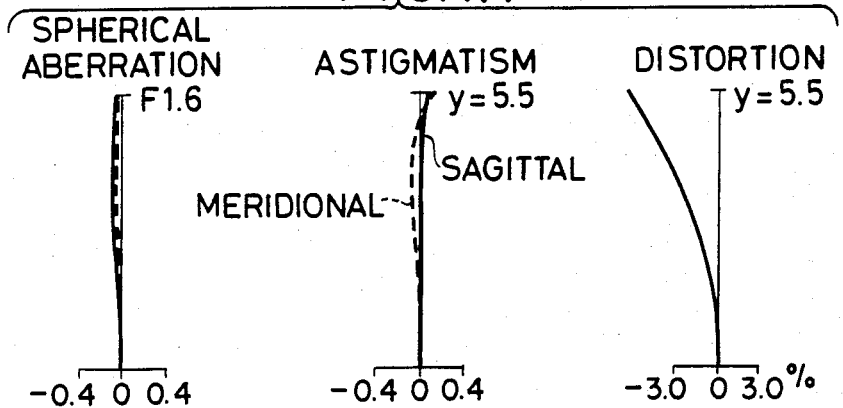
FIGS. 7(A) to 7(C) respectively show a spherical aberration, an astigmatism and a distortion in the minimum, intermediate and maximum focal length states, respectively, according to the third embodiment of the present invention (with the sine condition error amount being represented by dotted curves).
Figure 7B:
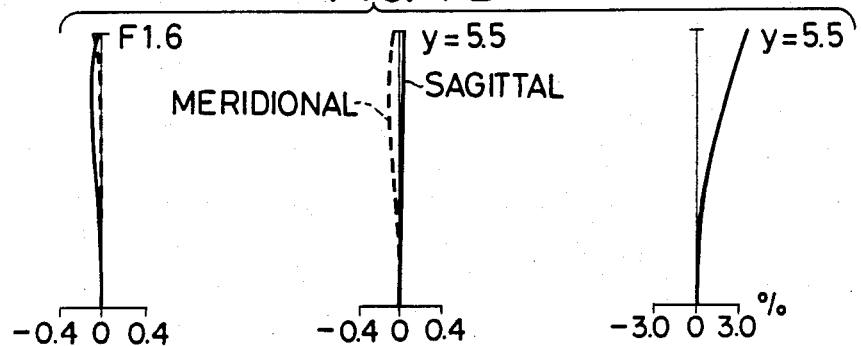
Figure 7C:
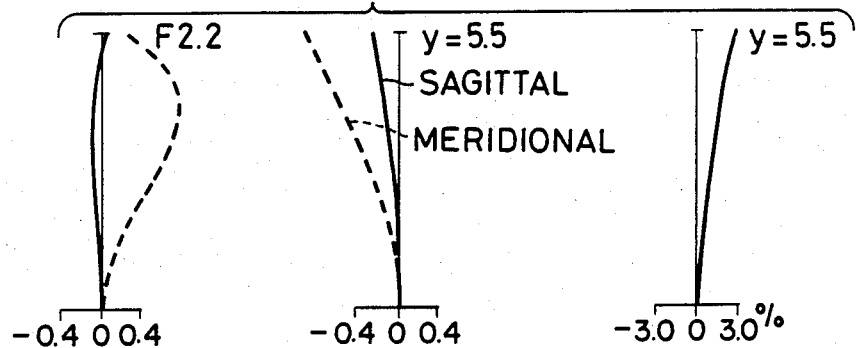

FIGS. 2, 4 and 6 respectively show the arrangements of the lenses according to the first, second and third embodiments of the present invention.

Numerical data of the lenses according to the respective embodiments are shown in Tables below. Note that the numerals at leftmost columns indicate the sequence number of each lens from the object side. Note also that the refractive index n and the Abbe number $\nu$ correspond to the d-line ($\lambda = 587.6$ nm).

First embodiment

Focal length: f = 9.26~134.0   Zooming ratio: 14.47
F-number: 1.6~2.2

| No. | Radius of curvature r | Central thickness of lens and distance therebetween d | Refractive index n | Abbe number $\nu$ | | | |
|---|---|---|---|---|---|---|---|
| 1 | −536.35 | 2.4 | 1.78470 | 26.07 | $L_{11}$ | | |
| 2 | 104.92 | 6.9 | | | | | |
| 3 | 179.11 | 9.4 | 1.59319 | 67.87 | $L_{12}$ | | |
| 4 | −141.55 | 0.2 | | | | | $G_1$ |
| 5 | 76.40 | 9.5 | 1.59319 | 67.87 | $L_{13}$ | | |
| 6 | −733.73 | 0.2 | | | | | |
| 7 | 53.60 | 6.9 | 1.59319 | 67.87 | $L_{14}$ | | |
| 8 | 123.34 | $d_8$ = (Variable) | | | | | |
| 9 | 43.50 | 1.0 | 1.87739 | 38.13 | $L_{21}$ | | |
| 10 | 17.10 | 3.3 | | | | | |
| 11 | 84.82 | 0.9 | 1.84042 | 43.30 | } $L_{22}$ | | $G_2$ |
| 12 | 20.74 | 2.2 | 1.80518 | 25.36 | | | |
| 13 | 40.08 | 3.4 | | | | | |
| 14 | −17.81 | 0.9 | 1.84042 | 43.30 | } $L_{23}$ | | |
| 15 | 22.70 | 3.8 | 1.86074 | 23.00 | | | |
| 16 | −48.56 | $d_{16}$ = (Variable) | | | | | |
| 17 | −24.82 | 0.9 | 1.77279 | 49.44 | } $L_3$ | $G_3$ | |
| 18 | 30.77 | 3.6 | 1.86074 | 23.00 | | | |
| 19 | 382.09 | $d_{19}$ = (Variable) | | | | | |
| 20 | −91.80 | 5.1 | 1.48749 | 70.24 | $L_{41}$ | $G_4$ | |
| 21 | −26.30 | 0.2 | | | | | |
| 22 | 230.00 | 5.5 | 1.44679 | 91.18 | $L_{42}$ | | |
| 23 | −42.18 | 0.2 | | | | | |
| 24 | 43.50 | 7.9 | 1.49782 | 82.28 | $L_{43}$ | | |
| 25 | −47.37 | 0.3 | | | | | |
| 26 | −43.37 | 1.5 | 1.84042 | 43.30 | $L_{44}$ | | |
| 27 | −1059.38 | 39.7 | | | | | |
| 28 | 103.00 | 2.0 | 1.87739 | 38.13 | } $L_{45}$ | | $G_4$ |
| 29 | 42.84 | 8.7 | 1.46450 | 65.79 | | | |
| 30 | −38.79 | 0.2 | | | | | |
| 31 | 296.66 | 2.0 | 1.87739 | 38.13 | } $L_{46}$ | | |
| 32 | 26.00 | 7.0 | 1.46450 | 65.79 | | | |
| 33 | −101.80 | 0.2 | | | | | |
| 34 | 27.45 | 4.6 | 1.51118 | 50.91 | $L_{47}$ | | |
| 35 | 311.00 | | | | | | |

| | | | |
|---|---|---|---|
| f | 9.26 | 35.0 | 134.0 |
| $d_8$ | 0.70 | 29.2 | 42.5 |
| $d_{16}$ | 42.4 | 10.2 | 3.1 |
| $d_{19}$ | 7.2 | 10.8 | 4.6 |

Petzval's sum = −0.00606
$f_1$ = 64.44
$f_{1N}$ = −110.60
$D_1$ = 13.49
$f_2$ = −13.16
$\beta_{2w}$ = −0.298

Second embodiment

Focal length: f = 9.22~134.0   Zooming ratio: 14.53
F-number: 1.6~2.2

| No. | Radius of curvature r | Central thickness of lens and distance therebetween d | Refractive index n | Abbe number $\nu$ | | |
|---|---|---|---|---|---|---|
| 1 | −540.94 | 2.4 | 1.78470 | 26.07 | $L_{11}$ | |
| 2 | 100.48 | 6.3 | | | | |
| 3 | 199.80 | 9.4 | 1.59319 | 67.87 | $L_{12}$ | |
| 4 | −133.87 | 0.2 | | | | $G_1$ |
| 5 | 73.29 | 10.5 | 1.59319 | 67.87 | $L_{13}$ | |
| 6 | −469.81 | 0.2 | | | | |
| 7 | 55.58 | 6.2 | 1.59319 | 67.87 | $L_{14}$ | |
| 8 | 121.99 | $d_8$ = (Variable) | | | | |

-continued

| No. | r | d | n | ν | | |
|---|---|---|---|---|---|---|
| 9 | 36.53 | 1.0 | 1.88069 | 41.02 | L$_{21}$ | |
| 10 | 17.37 | 4.2 | | | | |
| 11 | −129.06 | 0.9 | 1.88069 | 41.02 | } L$_{22}$ | G$_2$ |
| 12 | 17.29 | 3.2 | 1.86074 | 23.00 | | |
| 13 | 82.27 | 2.8 | | | | |
| 14 | −19.29 | 0.9 | 1.88069 | 41.02 | } L$_{23}$ | |
| 15 | 59.88 | 3.0 | 1.86074 | 23.00 | | |
| 16 | −41.83 | d$_{16}$ = (Variable) | | | | |
| 17 | −24.04 | 0.9 | 1.77279 | 49.44 | } L$_3$ | G$_3$ |
| 18 | 27.95 | 4.0 | 1.80518 | 25.36 | | |
| 19 | −1642.96 | d$_{19}$ = (Variable) | | | | |
| 20 | −127.31 | 5.3 | 1.51860 | 70.08 | L$_{41}$ | G$_4$ |
| 21 | −27.04 | 0.2 | | | | |
| 22 | 217.27 | 4.1 | 1.51860 | 70.08 | L$_{42}$ | |
| 23 | −63.27 | 0.2 | | | | |
| 24 | 46.58 | 7.3 | 1.49782 | 82.28 | L$_{43}$ | |
| 25 | −76.47 | 1.3 | | | | |
| 26 | −52.10 | 1.5 | 1.88069 | 41.02 | L$_{44}$ | |
| 27 | −3334.08 | 42.6 | | | | |
| 28 | 115.63 | 2.0 | 1.88580 | 41.26 | } L$_{45}$ | G$_4$ |
| 29 | 42.22 | 9.3 | 1.46450 | 65.79 | | |
| 30 | −38.84 | 0.2 | | | | |
| 31 | 164.66 | 2.0 | 1.88069 | 41.02 | } L$_{46}$ | |
| 32 | 30.25 | 8.8 | 1.46450 | 65.79 | | |
| 33 | −106.79 | 0.2 | | | | |
| 34 | 28.37 | 6.2 | 1.49782 | 82.28 | L$_{47}$ | |
| 35 | 139.01 | | | | | |

| | | | |
|---|---|---|---|
| f | 9.26 | 35.0 | 134.0 |
| d$_8$ | 0.64 | 29.4 | 42.7 |
| d$_{16}$ | 42.64 | 10.15 | 3.13 |
| d$_{19}$ | 7.47 | 11.14 | 4.83 |

Petzval's sum = −0.00749
f$_1$ = 64.90
f$_{1N}$ = −106.84
D$_1$ = 13.35
f$_2$ = −13.25
β$_{2w}$ = −0.298

Third embodiment

Focal length: f = 9.26~134.0  Zooming ratio: 14.47
F-number: 1.6~2.2

| No. | Radius of curvature r | Central thickness of lens and distance therebetween d | Refractive index n | Abbe number ν | | |
|---|---|---|---|---|---|---|
| 1 | −558.96 | 5.6 | 1.79208 | 24.16 | L$_{11}$ | |
| 2 | 105.79 | 5.5 | | | | |
| 3 | 189.23 | 9.4 | 1.59522 | 68.03 | L$_{12}$ | |
| 4 | −144.30 | 0.2 | | | | G$_1$ |
| 5 | 75.76 | 9.5 | 1.59522 | 68.03 | L$_{13}$ | |
| 6 | −781.31 | 0.2 | | | | |
| 7 | 53.69 | 6.9 | 1.59523 | 68.03 | L$_{14}$ | |
| 8 | 134.86 | d$_8$ = (Variable) | | | | |
| 9 | 43.11 | 1.0 | 1.88300 | 36.96 | L$_{21}$ | |
| 10 | 17.27 | 3.3 | | | | |
| 11 | 85.13 | 0.9 | 1.84491 | 42.14 | } L$_{22}$ | G$_2$ |
| 12 | 18.28 | 2.2 | 1.81281 | 23.53 | | |
| 13 | 42.20 | 3.4 | | | | |
| 14 | −18.46 | 0.9 | 1.84490 | 42.16 | } L$_{23}$ | |
| 15 | 23.38 | 3.8 | 1.87050 | 21.22 | | |
| 16 | −56.26 | d$_{16}$ = (Variable) | | | | |
| 17 | −24.82 | 0.9 | 1.77659 | 48.93 | } L$_3$ | G$_3$ |
| 18 | 30.78 | 3.6 | 1.87050 | 21.22 | | |
| 19 | 382.10 | d$_{19}$ = (Variable) | | | | |
| 20 | −91.80 | 5.1 | 1.48946 | 71.87 | L$_{41}$ | G$_4$ |
| 21 | −26.30 | 0.2 | | | | |
| 22 | 230.00 | 5.5 | 1.44821 | 92.22 | L$_{42}$ | |
| 23 | −42.18 | 0.2 | | | | |
| 24 | 43.50 | 7.9 | 1.50009 | 83.07 | L$_{43}$ | |
| 25 | −47.38 | 0.3 | | | | |
| 26 | −43.37 | 1.5 | 1.84486 | 42.14 | L$_{44}$ | |
| 27 | −1059.34 | 39.75 | | | | |

-continued

| | | | | | | |
|---|---|---|---|---|---|---|
| 28 | 103.00 | 2.0 | 1.88297 | 36.94 | } $L_{45}$ | $G_4$ |
| 29 | 42.84 | 8.7 | 1.46593 | 66.85 | | |
| 30 | −38.79 | 0.2 | | | | |
| 31 | 296.66 | 2.0 | 1.88298 | 36.94 | } $L_{46}$ | |
| 32 | 26.00 | 7.0 | 1.46593 | 66.85 | | |
| 33 | −101.80 | 0.2 | | | | |
| 34 | 27.45 | 4.6 | 1.51239 | 50.19 | $L_{47}$ | |
| 35 | 311.00 | | | | | |
| f | | 9.26 | 35.0 | 134.0 | | |
| $d_8$ | | 0.11 | 28.66 | 41.94 | | |
| $d_{16}$ | | 42.69 | 10.53 | 3.43 | | |
| $d_{19}$ | | 7.21 | 10.81 | 4.62 | | |

Petzval's sum = −0.00547
$f_1$ = 64.44
$f_{1N}$ = −111.89
$D_1$ = 12.58
$f_2$ = −13.16
$\beta_{2w}$ = −0.298

We claim:

1. A zoom lens having a high zooming ratio, a high aperture ratio and a wide angle of view comprising, in the order from the object side:

a first lens group which has a positive power and is fixed in position during zooming, second and third lens groups which have negative powers and movable during zooming, and a fourth lens group which is fixed in position during zooming;

wherein when said zoom lens is zoomed from a wide angle end to a telephoto end, said second lens group is monotonously moved along an optical axis from the side of the object to a side of an image, and said third lens group reciprocates along the optical axis; and said zoom lens satisfies the following conditions:

$$0.68 < \sqrt{FT} \cdot f1/fT < 0.74$$

$$1.1 < |\beta_{2w} \cdot \sqrt{v}| < 1.3$$

where fT is a focal length of an entire optical system at the telephoto end, FT is a minimum F number at the telephoto end, f1 is a focal length of said first lens group, $\beta_{2w}$ is a magnification factor of said second lens group at the wide angle end, and v is a zooming ratio.

2. A zoom lens according to claim 1, wherein said first lens group comprises, in the order from the object side, a negative lens having a focal length f1N, and a positive lens group consisting of three positive lenses; and said zoom lens satisfies the following conditions:

$$1.5 < |f1N/f1| < 1.85$$

$$0.19 < D1/f1 < 0.22$$

where D1 is a distance between a principal point of said negative lens which is at the side of the image and a principal point of said positive lens group which is at the side of the object.

3. A zoom lens according to claim 2, wherein said second lens group comprises, in the order from the object side, a negative meniscus lens having a convex surface facing the side of the object, a doublet consisting of a convex lens and a concave lens cemented together and having a surface of a greater curvature facing the side of the image, and a doublet meniscus lens consisting of a convex lens and a concave lens cemented together and having a convex surface facing the side of the image; and said zoom lens satisfies the following condition:

$$2.4 < |R21/f2| < 3.7$$

where f2 is a focal length of said second lens group and R21 is a radius of curvature of the surface of said negative meniscus lens facing the side of the object.

4. A zoom lens according to claim 3, wherein said third lens group comprises a negative doublet lens consisting of a double-convex lens and a positive lens cemented together.

5. A zoom lens according to claim 3, wherein said fourth lens group comprises, in the order from the object side, a front group consisting of a positive meniscus lens having a convex surface facing the side of the image, a first biconvex lens, a second biconvex lens, and a negative lens having a surface with a greater curvature facing the side of the object; and a rear group consisting of two doublet positive lenses, and a positive meniscus lens having a convex surface facing the side of the object.

6. A zoom lens according to claim 3, satisfying the following numeral data:

Focal length: f = 9.26 ~ 134.0   Zooming ratio: 14.47
F-number: 1.6 ~ 2.2

| No. | Radius of curvature r | Central thickness of lens and distance therebetween d | Refractive index n | Abbe number v | |
|---|---|---|---|---|---|
| 1 | −536.35 | 2.4 | 1.78470 | 26.07 | $L_{11}$ |
| 2 | 104.92 | 6.9 | | | |

-continued

Focal length: f = 9.26~134.0  Zooming ratio: 14.47
F-number: 1.6~2.2

| No. | r | d | n | ν | | |
|---|---|---|---|---|---|---|
| 3 | 179.11 | 9.4 | 1.59319 | 67.87 | $L_{12}$ | |
| 4 | −141.55 | 0.2 | | | | $G_1$ |
| 5 | 76.40 | 9.5 | 1.59319 | 67.87 | $L_{13}$ | |
| 6 | −733.73 | 0.2 | | | | |
| 7 | 53.60 | 6.9 | 1.59319 | 67.87 | $L_{14}$ | |
| 8 | 123.34 | $d_8$ = (Variable) | | | | |
| 9 | 43.50 | 1.0 | 1.87739 | 38.13 | $L_{21}$ | |
| 10 | 17.10 | 3.3 | | | | |
| 11 | 84.82 | 0.9 | 1.84042 | 43.30 | $L_{22}$ | $G_2$ |
| 12 | 20.74 | 2.2 | 1.80518 | 25.36 | | |
| 13 | 40.08 | 3.4 | | | | |
| 14 | −17.81 | 0.9 | 1.84042 | 43.30 | $L_{23}$ | |
| 15 | 22.70 | 3.8 | 1.86074 | 23.00 | | |
| 16 | −48.56 | $d_{16}$ = (Variable) | | | | |
| 17 | −24.82 | 0.9 | 1.77279 | 49.44 | $L_3$ | $G_3$ |
| 18 | 30.77 | 3.6 | 1.86074 | 23.00 | | |
| 19 | 382.09 | $d_{19}$ = (Variable) | | | | |
| 20 | −91.80 | 5.1 | 1.48749 | 70.24 | $L_{41}$ | $G_4$ |
| 21 | −26.30 | 0.2 | | | | |
| 22 | 230.00 | 5.5 | 1.44679 | 91.18 | $L_{42}$ | |
| 23 | −42.18 | 0.2 | | | | |
| 24 | 43.50 | 7.9 | 1.49782 | 82.28 | $L_{43}$ | |
| 25 | −47.37 | 0.3 | | | | |
| 26 | −43.37 | 1.5 | 1.84042 | 43.30 | $L_{44}$ | |
| 27 | −1059.38 | 39.7 | | | | |
| 28 | 103.00 | 2.0 | 1.87739 | 38.13 | $L_{45}$ | $G_4$ |
| 29 | 42.84 | 8.7 | 1.46450 | 65.79 | | |
| 30 | −38.79 | 0.2 | | | | |
| 31 | 296.66 | 2.0 | 1.87739 | 38.13 | $L_{46}$ | |
| 32 | 26.00 | 7.0 | 1.46450 | 65.79 | | |
| 33 | −101.80 | 0.2 | | | | |
| 34 | 27.45 | 4.6 | 1.51118 | 50.91 | $L_{47}$ | |
| 35 | 311.00 | | | | | |

| | | | |
|---|---|---|---|
| f | 9.26 | 35.0 | 134.0 |
| $d_8$ | 0.70 | 29.2 | 42.5 |
| $d_{16}$ | 42.4 | 10.2 | 3.1 |
| $d_{19}$ | 7.2 | 10.8 | 4.6 |

Petzval's sum = −0.00606
$f_1$ = 64.44
$f_{1N}$ = −110.60
$D_1$ = 13.49
$f_2$ = −13.16
$\beta_{2w}$ = −0.298

7. A zoom lens according to claim 3, satisfying the following numerical data:

Focal length: f = 9.22~134.0  Zooming ratio: 14.53
F-number: 1.6~2.2

| No. | Radius of curvature r | Central thickness of lens and distance therebetween d | Refractive index n | Abbe number ν | | |
|---|---|---|---|---|---|---|
| 1 | −540.94 | 2.4 | 1.78470 | 26.07 | $L_{11}$ | |
| 2 | 100.48 | 6.3 | | | | |
| 3 | 199.80 | 9.4 | 1.59319 | 67.87 | $L_{12}$ | $G_1$ |
| 4 | −133.87 | 0.2 | | | | |
| 5 | 73.29 | 10.5 | 1.59319 | 67.87 | $L_{13}$ | |
| 6 | −469.81 | 0.2 | | | | |
| 7 | 55.58 | 6.2 | 1.59319 | 67.87 | $L_{14}$ | |
| 8 | 121.99 | $d_8$ = (Variable) | | | | |
| 9 | 36.53 | 1.0 | 1.88069 | 41.02 | $L_{21}$ | |
| 10 | 17.37 | 4.2 | | | | |
| 11 | −129.06 | 0.9 | 1.88069 | 41.02 | $L_{22}$ | $G_2$ |
| 12 | 17.29 | 3.2 | 1.86074 | 23.00 | | |
| 13 | 82.27 | 2.8 | | | | |
| 14 | −19.29 | 0.9 | 1.88069 | 41.02 | $L_{23}$ | |

-continued

Focal length: f = 9.22~134.0  Zooming ratio: 14.53
F-number: 1.6~2.2

| No. | r | d | n | ν | | |
|---|---|---|---|---|---|---|
| 15 | 59.88 | 3.0 | 1.86074 | 23.00 | | |
| 16 | −41.83 | d₁₆ = (Variable) | | | | |
| 17 | −24.04 | 0.9 | 1.77279 | 49.44 | } L₃ - G₃ | |
| 18 | 27.95 | 4.0 | 1.80518 | 25.36 | | |
| 19 | −1642.96 | d₁₉ = (Variable) | | | | |
| 20 | −127.31 | 5.3 | 1.51860 | 70.08 | L₄₁ | G₄ |
| 21 | −27.04 | 0.2 | | | | |
| 22 | 217.27 | 4.1 | 1.51860 | 70.08 | L₄₂ | |
| 23 | −63.27 | 0.2 | | | | |
| 24 | 46.58 | 7.3 | 1.49782 | 82.28 | L₄₃ | |
| 25 | −76.47 | 1.3 | | | | |
| 26 | −52.10 | 1.5 | 1.88069 | 41.02 | L₄₄ | |
| 27 | −3334.08 | 42.6 | | | | |
| 28 | 115.63 | 2.0 | 1.88580 | 41.26 | } L₄₅ | G₄ |
| 29 | 42.22 | 9.3 | 1.46450 | 65.79 | | |
| 30 | −38.84 | 0.2 | | | | |
| 31 | 164.66 | 2.0 | 1.88069 | 41.02 | } L₄₆ | |
| 32 | 30.25 | 8.8 | 1.46450 | 65.79 | | |
| 33 | −106.79 | 0.2 | | | | |
| 34 | 28.37 | 6.2 | 1.49782 | 82.28 | L₄₇ | |
| 35 | 139.01 | | | | | |

| | | | |
|---|---|---|---|
| f | 9.26 | 35.0 | 134.0 |
| $d_8$ | 0.64 | 29.4 | 42.7 |
| $d_{16}$ | 42.64 | 10.15 | 3.13 |
| $d_{19}$ | 7.47 | 11.14 | 4.83 |

Petzval's sum = −0.00749
$f_1$ = 64.90
$f_{1N}$ = −106.84
$D_1$ = 13.35
$f_2$ = −13.25
$β_{2w}$ = −0.298

8. A zoom lens according to claim 3, satisfying the following numerical data:

Focal length: f = 9.26~134.0  Zooming ratio: 14.47
F-number: 1.6~2.2

| No. | Radius of curvature r | Central thickness of lens and distance therebetween d | Refractive index n | Abbe number ν | | |
|---|---|---|---|---|---|---|
| 1 | −558.96 | 5.6 | 1.79208 | 24.16 | L₁₁ | |
| 2 | 105.79 | 5.5 | | | | |
| 3 | 189.23 | 9.4 | 1.59522 | 68.03 | L₁₂ | G₁ |
| 4 | −144.30 | 0.2 | | | | |
| 5 | 75.76 | 9.5 | 1.59522 | 68.03 | L₁₃ | |
| 6 | −781.31 | 0.2 | | | | |
| 7 | 53.69 | 6.9 | 1.59523 | 68.03 | L₁₄ | |
| 8 | 134.86 | d₈ = (Variable) | | | | |
| 9 | 43.11 | 1.0 | 1.88300 | 36.96 | L₂₁ | |
| 10 | 17.27 | 3.3 | | | | |
| 11 | 85.13 | 0.9 | 1.84491 | 42.14 | } L₂₂ | G₂ |
| 12 | 18.28 | 2.2 | 1.81281 | 23.53 | | |
| 13 | 42.20 | 3.4 | | | | |
| 14 | −18.46 | 0.9 | 1.84490 | 42.16 | } L₂₃ | |
| 15 | 23.38 | 3.8 | 1.87050 | 21.22 | | |
| 16 | −56.26 | d₁₆ = (Variable) | | | | |
| 17 | −24.82 | 0.9 | 1.77659 | 48.93 | } L₃ - G₃ | |
| 18 | 30.78 | 3.6 | 1.87050 | 21.22 | | |
| 19 | 382.10 | d₁₉ = (Variable) | | | | |
| 20 | −91.80 | 5.1 | 1.48946 | 71.87 | L₄₁ | G₄ |
| 21 | −26.30 | 0.2 | | | | |
| 22 | 230.00 | 5.5 | 1.44821 | 92.22 | L₄₂ | |
| 23 | −42.18 | 0.2 | | | | |
| 24 | 43.50 | 7.9 | 1.50009 | 83.07 | L₄₃ | |
| 25 | −47.38 | 0.3 | | | | |
| 26 | −43.37 | 1.5 | 1.84486 | 42.14 | L₄₄ | |
| 27 | −1059.34 | 39.75 | | | | |

-continued

Focal length: f = 9.26~134.0   Zooming ratio: 14.47
F-number: 1.6~2.2

| | | | | | | |
|---|---|---|---|---|---|---|
| 28 | 103.00 | 2.0 | 1.88297 | 36.94 | } L$_{45}$ | G$_4$ |
| 29 | 42.84 | 8.7 | 1.46593 | 66.85 | | |
| 30 | −38.79 | 0.2 | | | | |
| 31 | 296.66 | 2.0 | 1.88298 | 36.94 | } L$_{46}$ | |
| 32 | 26.00 | 7.0 | 1.46593 | 66.85 | | |
| 33 | −101.80 | 0.2 | | | | |
| 34 | 27.45 | 4.6 | 1.51239 | 50.19 | L$_{47}$ | |
| 35 | 311.00 | | | | | |

| | | | |
|---|---|---|---|
| f | 9.26 | 35.0 | 134.0 |
| d$_8$ | 0.11 | 28.66 | 41.94 |
| d$_{16}$ | 42.69 | 10.53 | 3.43 |
| d$_{19}$ | 7.21 | 10.81 | 4.62 |

Petzval's sum = −0.00547
f$_1$ = 64.44
f$_{1N}$ = −111.89
D$_1$ = 12.58
f$_2$ = −13.16
β$_{2w}$ = −0.298